(12) United States Patent
Lai (10) Patent No.: US 8,146,936 B2
(45) Date of Patent: Apr. 3, 2012

(54) CHILD TRAILER

(76) Inventor: Chin-I Lai, Tainan County (TW)

( * ) Notice: Subject to any disclaimer, the term of this patent is extended or adjusted under 35 U.S.C. 154(b) by 79 days.

(21) Appl. No.: 12/778,672

(22) Filed: May 12, 2010

(65) Prior Publication Data

US 2011/0278823 A1 Nov. 17, 2011

(51) Int. Cl.
*B62K 27/00* (2006.01)
(52) U.S. Cl. ............... 280/204; 280/202; 280/288.4; 280/292
(58) Field of Classification Search .......... 280/202, 280/203, 204, 288.4, 292
See application file for complete search history.

(56) References Cited

U.S. PATENT DOCUMENTS

| | | | | |
|---|---|---|---|---|
| 5,215,318 A | * | 6/1993 | Capraro | 280/1.5 |
| 5,599,033 A | * | 2/1997 | Kolbus et al. | 280/204 |
| 6,193,252 B1 | * | 2/2001 | Lin | 280/204 |
| 6,196,572 B1 | * | 3/2001 | Durrin | 280/648 |
| 6,827,356 B2 | * | 12/2004 | Zhuang | 280/32.7 |
| 7,341,265 B1 | * | 3/2008 | Liu | 280/204 |
| 7,850,185 B2 | * | 12/2010 | Weng et al. | 280/204 |
| 2002/0096857 A1 | * | 7/2002 | Valdez et al. | 280/293 |
| 2010/0078912 A1 | * | 4/2010 | Chang et al. | 280/204 |

* cited by examiner

*Primary Examiner* — Tony H. Winner
*Assistant Examiner* — Marc Scharich
(74) *Attorney, Agent, or Firm* — Muncy, Geissler, Olds & Lowe, PLLC (57) ABSTRACT

A child trailer includes a body which includes a plurality of wheel assemblies at the bottom and a joint assembly at the front side to adjust the angle relative to the body. Hence the child trailer can be maintained at a desired angle to support standing of a child or holding of goods. The joint assembly includes a coupler at the front side to fasten the child trailer to the chassis such as a wheel axle, frame or handle of a stroller, thereby can facilitate standing of the child or holding of goods.

14 Claims, 10 Drawing Sheets

CHILD TRAILER

FIELD OF THE INVENTION

The present invention relates to a carrier coupled with a stroller to carry goods or support standing of a child.

BACKGROUND OF THE INVENTION

Children's goods are numerous and often bulky in size. When taking children outdoors, parents have to prepare and carry a lot of goods such as foods, drinks, clothes, toys and sanitary articles. It often happens that one parent has to take care of children while another parent has to carry all the prepared goods in a backpack or bags. This creates heavy burdens to the shoulder and arms of the parents without much chance for rest. It heavily taxes the physical strength and comfort of the parents.

It also frequently happens that when the parents take a bigger child to shopping malls, they would put the child on the shopping cart to reduce the carrying burden. But the shopping cart is not designed for this purpose, and toppling or colliding of the shopping cart could happen if not maneuvering properly, and could result in hurting the child. Moreover, the shopping cart is commonly made of steel racks which are easily contaminated with all kinds of microbes and bacteria. The child sitting on the cart could be infected by those bacteria when his/her hands touch the mouth and nose after having in contact with the steel racks.

SUMMARY OF THE INVENTION

In view of the conventional stroller often is foldable to facilitate carrying and storing, and does not provide much room for holding goods, hence parents usually have to carry a backpack or bags to hold the goods when they take children outdoors. In the event that two children are presented or a small child needs constant care, the parents often are overwhelmed. Therefore, it is an object of the present invention to provide a child trailer that can be fastened to the chassis such as a wheel axle, frame or handle of a stroller or hand-moving cart to allow a child to stand thereon or hold goods to alleviate the burden of parents and make moving and taking care of the child easier.

The child trailer according to the invention includes: a body which has a latch on a rear side with a through hole formed thereon threaded by a strap for storing and also to hook on a handle or other fastening portion of a stroller, and two wheel assemblies at the rear bottom of two sides thereof equipped with shock-absorbing function;

a joint assembly which is located in front of the body and has a movable joint adjustable to a desired angle before being latched on a fixed condition, hence can be flexibly adjusted according to the height of the transverse chassis such as the wheel axle, frame or handle of the stroller or the body portion to be fastened; and a coupler which is fastened to the front side of the joint assembly and includes a seat which has a slide track at each of two sides at the front side thereof, a set of symmetrical first adjustment arm and second adjustment arm slidable on two slide tracks at two sides thereof, and a clamp means located at a lower outer side in front of the first and second adjustment arms.

The coupler can be adjusted at a desired width. In the event that the width of the transverse chassis such as the wheel axle, frame or handle of the stroller or hand-moving cart for fastening is wider than that of the clamp means at two sides, the first and second adjustment arms can be extended outwards to increase the width of the two clamp means to enhance hitching steadiness. On the other hand, if the width for fastening of the transverse chassis is narrower than that of the interval between the two clamp means, the first and second adjustment arms can be disassembled and exchanged sides left and right to position the two clamp means close to the center and flexibly adjust the distance thereof. In addition, the first and second adjustment arms also can be flipped and installed upside down to dodge the transverse chassis if it is needed to position the two clamp means below the transverse chassis. The first and second adjustment arms also can be disassembled and flipped upside down and exchanged sides left and right to mate the transverse chassis of different strollers or hand-moving carts.

The invention provides features as follow: the joint assembly is adjustable in angle and the two clamp means is adjustable in width and direction so that the clamp means can be latched with the chassis or other fastenable portion of various types of the strollers or hand-moving carts to fasten the child trailer at the rear side thereof to provide an additional platform for supporting standing of the child or holding goods, thereby can alleviate the burden of the parents when taking the children outdoors.

In an embodiment of the invention, the child trailer is fastened to the chassis such as the wheel axle, frame or handle of the stroller or hand-moving cart by means of a strap. This embodiment includes a coupler fastened to the front end of the joint assembly and includes a set of fan-shaped and engaged gears hinged on the front end of a coupling duct of the seat. The fan-shaped gears are extendable or retractable synchronously towards or from two sides. Each fan-shaped gear has a telescopic tube assembly at the front end with an adjustable length. The telescopic tube assembly has a latch ring at the front end to latch a strap holder. The strap holder has a strap and an engagement means at the front side that are engageable with each other.

When the coupler of the invention is in use, fasten the child trailer to the chassis such as the wheel axle, frame or handle of the stroller or hand-moving cart through the strap; through the latch ring at the front end of the telescopic tube assembly, the angle of the strap holder and the stroller or hand-moving cart can be adjusted, and the extended width at two sides and length can be adjusted respectively through the fan-shaped gears and telescopic tube assembly to mate various types of the strollers or hand-moving carts.

In short, by fastening the coupler to the rear side of any type of the stroller or hand-moving cart, the present invention provides many advantages, notably:

1. The joint assembly is adjustable in angle to allow the child trailer to be latched on the chassis of varying strollers or hand-moving carts according to different purposes such as carrying a child or holding goods.

2. The coupler is adjustable to a wider range in width to be latched on the chassis of the strollers and hand-moving carts in varying sizes.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Please refer to FIGS. 1 through 4, the present invention aims to provide a child trailer 1 which comprises a body 2, a joint assembly 3 and a coupler 4.

The body 2 has a holder 21 on a rear side. The holder 21 has an upper side and a lower side formed respectively with a trench 211 and 212, and a rear side engaged with a latch 22. The latch 22 has a front side with latch hooks 221 and 222 located respectively on an upper side and lower side corresponding to the trenches 211 and 212, and a through hole 223 on a lower side at the rear end. The rear bottom of the body 2 has a wheel hub 23 at each of two sides thereof. The wheel hub 23 has an axle hole 231 in the center and a horizontal insertion hole 232 close to the bottom. The insertion hole 232 has a fastening hole 233 corresponding to the axle hole 231. The fastening hole 233 is hollow and communicates with the axle hole 231 and the insertion hole 232. The insertion hole 232 holds an elastic element 24 which has two sides indented inwards in the middle to form a set of latch flanges 241 spaced from each other at a distance smaller than the diameter of the axle hole 231. When the elastic element 24 is held in the fastening hole 233, the latch flanges 241 are slid and latched in the fastening hole 233 communicating with the axle hole 231 so that the latch flanges 241 are exposed out of the fastening hole 233. The wheel hub 23 holds axially a wheel assembly 25. The wheel assembly 25 has a wheel axle 251 at the upper side and an annular groove 252 in the middle portion corresponding to the latch flanges 241 formed at a smaller diameter. When the wheel axle 251 stretches into the axle hole 231 of the wheel hub 23, the annular groove 252 slides into the latch flanges 241 so that the wheel hub 23 can clamp the wheel assembly 25. There is a wheel holder 253 located below the wheel axle 251 that is a clip with an opening hinged and openable up and down. The wheel holder 253 has an elastic bracing element 254 close to the opening. The bracing element 254 has two ends butting two corresponding end surfaces of the wheel holder 253 close to the clip opening. There is a wheel 255 axially mounted at a lower side of the wheel holder 253.

The joint assembly 3 is located in front of the body 2, and includes a pair of holding ducts 31 coaxially located at the front end of the body 2 close to two outer sides. Each holding duct 31 has a plurality of splines 311 on the inner rim. There is a coupling duct 32 interposed coaxially between the holding ducts 31. The coupling duct 32 has inner threads (not shown in the drawings) formed on the inner wall in the center and a plurality of slots 321 formed on the inner wall close to two outer sides corresponding to the splines 311. The holding ducts 31 and coupling duct 32 are run through by a telescopic sleeve 33 inside. The telescopic sleeve 33 holds a pin 331 corresponding to the axis of the coupling duct 32. The pin 331 has a smooth portion 3311 close to each distal end at two outer sides. The smooth portion 3311 has two latch means 3312 respectively on an inner and outer end. The pin 331 is coupled with two screws 332 on the smooth portions 3311 close to two distal ends. The screw 332 is slidable on the smooth portion 3311 between the latch means 3312 along the pin 331 to allow the telescopic sleeve 33 to extend or retract. The screw 332 has threads 3321 in the center mating the inner threads of the coupling duct 32, and is slidably coupled with a tooth duct 333 close to an outer end thereof. The tooth duct 333 has a tooth portion 3331 on the outer wall to latch the splines 311 of the holding ducts 31 and slots 321 of the coupling duct 32. The tooth duct 333 also has a spring washer 334 close to the center to serve as buffer during screwing.

The coupler 4 is fastened to the front end of the joint assembly 3, and includes a seat 41 and a pair of symmetrical first adjustment arm 42 and second adjustment arm 42a. The seat 41 is fastened to the front end of the coupling duct 32, and has two slide tracks 411 at two sides of the front side extended outwards from the center, two safety latches 412 close to two outer edges, and a slide rail 413 in the center of the front end. The first and second adjustment arms 42 and 42a are coupled on the slide rail 413 from two outer sides, and have respectively a penetrating passage 421 and 421a mating the slide rail 413. The penetrating passages 421 and 421a respectively have an opening at each of two sides with a mating latch portion 422 and 422a located thereon, and an ornamental plate 423 and 423a latched on the latch portions 422 and 422a at two outer sides. The penetrating passages 421 and 421a are coupled on the slide rail 413 from the two outer sides. The first and second adjustment arms 42 and 42a have respectively a slide flute 424 and 424a on the rear edge corresponding to and latching on the slide rail 411 so that they can slide on the slide track 411 and slide rail 413. The first and second adjustment arms 42 and 42a also have respectively a plurality of notches 425 and 425a at the upper and lower sides of the slide flutes 424 and 424a corresponding to the safety latches 412, hence can be latched and anchored by the safety latches 412 close to the outer edges of the seat 41. The first and second adjustment arms 42 and 42a further have respectively a clamp means 426 and 426a located below an outer side thereof. The clamp means 426 and 426a include respectively a pair of engaged first clamps 4261 and 4261a and second clamps 4262 and 4262a. The first clamps 4261 and 4261a are located respectively on an outer side of the first and second adjustment arms 42 and 42a and have respectively an arched surface on the front side indented inwards and have respectively an upper side coupled with an elastic fastener 4263 and 4263a and have respectively a lower side equipped with a turnable shaft 4264 and 4264a engaged with the second clamps 4262 and 4262a. The second clamps 4262 and 4262a have respectively a rear side formed an arched surface indented inwards, and have respectively a latch portion 4265 and 4265a formed thereon to latch the fasteners 4263 and 4263a of the first clamps 4261 and 4261a.

Figure 4:
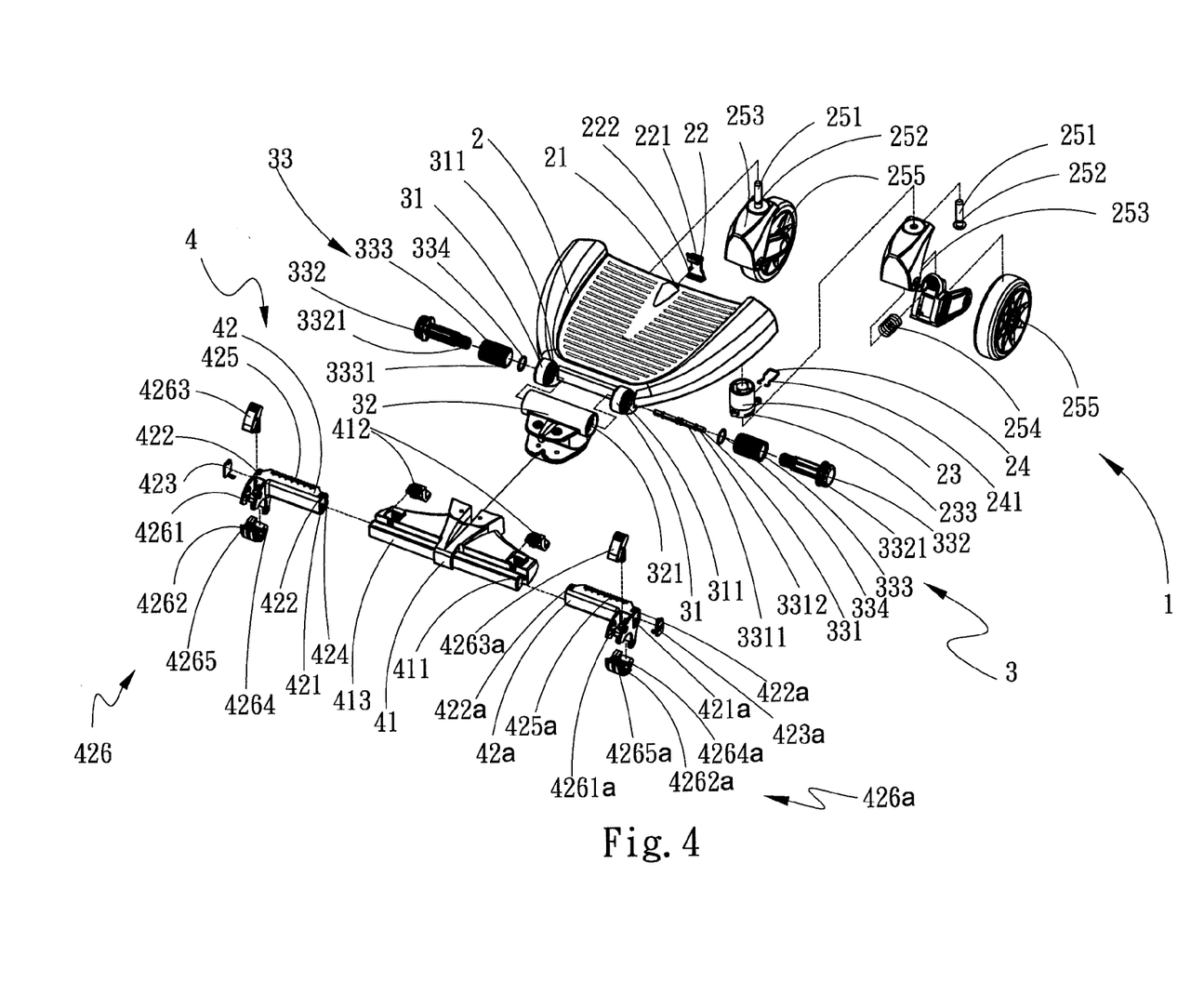
FIG. 4 is an exploded view of the invention.
Figure 5:
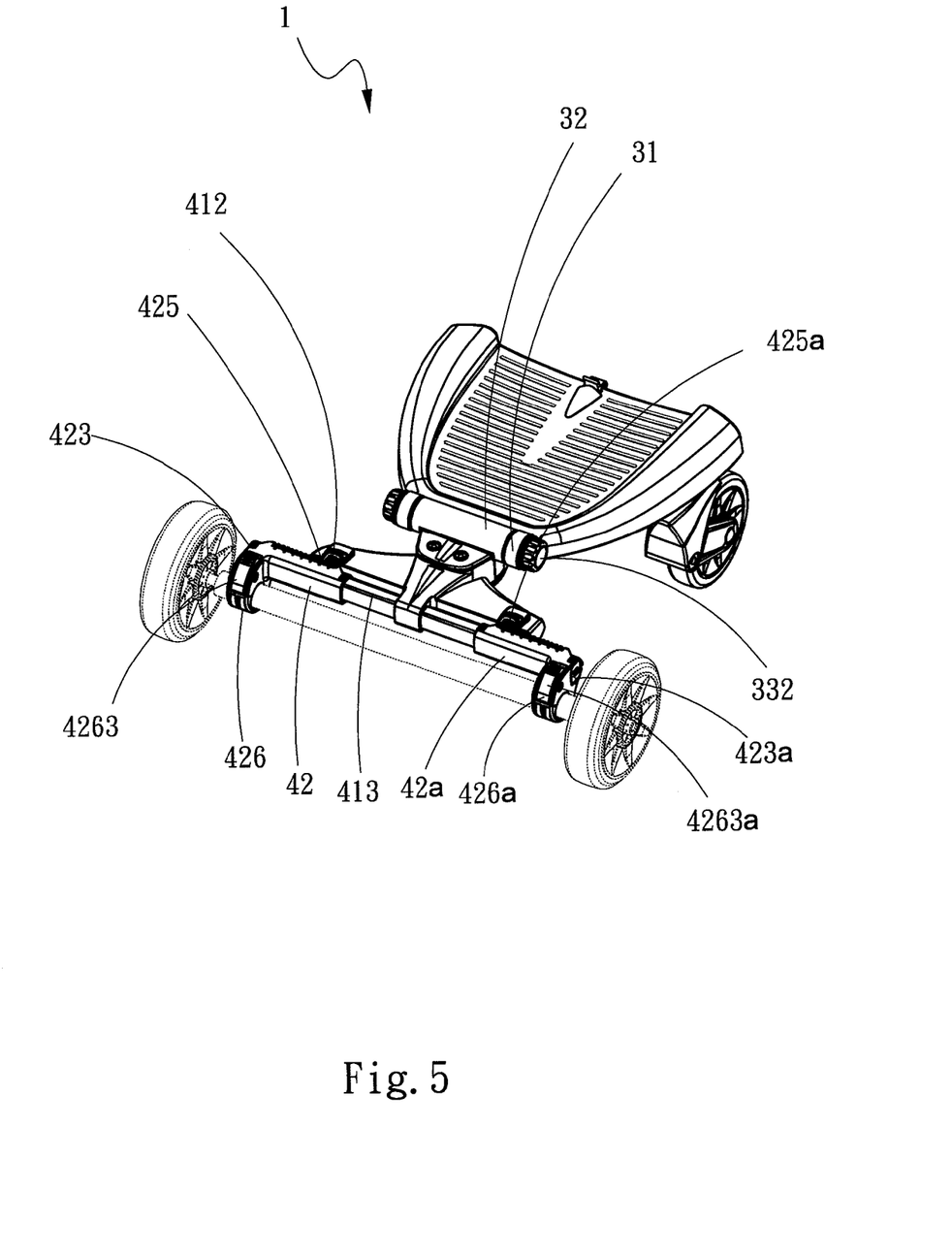
FIG. 5 is a perspective view of the invention in use condition-1.

Referring to FIGS. 4 and 5, when the invention is in use, depress the safety latches 412 to extend the first and second adjustment arms 42 and 42a outwards toward the two outer sides to adjust the clamp means 426 and 426a at a desired width to mate the transverse chassis of the stroller; then release the safety latches 412 to latch on the corresponding notches 425 and 425a of the first and second adjustment arms 42 and 42a to maintain the width of the clamp means 426 and 426a; next, unfasten the screws 332 at two sides of the joint assembly 3, and withdraw the two tooth ducts 333 through the two outer sides with the tooth portion 3331 separated from the slots 321 of the coupling duct 32; adjust the holding ducts 31 and the coupling duct 32 to a desired angle, push the two tooth ducts 333 inwards from the two outer sides to latch the tooth portion 3331 on the splines 311 of the holding ducts 31 and slots 321 of the coupling duct 32, then fasten the screws 332; finally, depress the fasteners 4263 and 4263a to release the second clamps 4262 and 4262a, so that the transverse chassis of the stroller is located on the indented arched surfaces at the front sides of the first clamps 4261 and 4261a and the indented arched surfaces at the rear sides of the second clamps 4262 and 4262a to hitch the clamp means 426 and 426a on the transverse chassis with the first and second adjustment arms 42 and 42a positioned above the transverse chassis; then depress and latch the second clamps 4262 and 4262a on the fasteners 4263 and 4263a.

Figure 6:
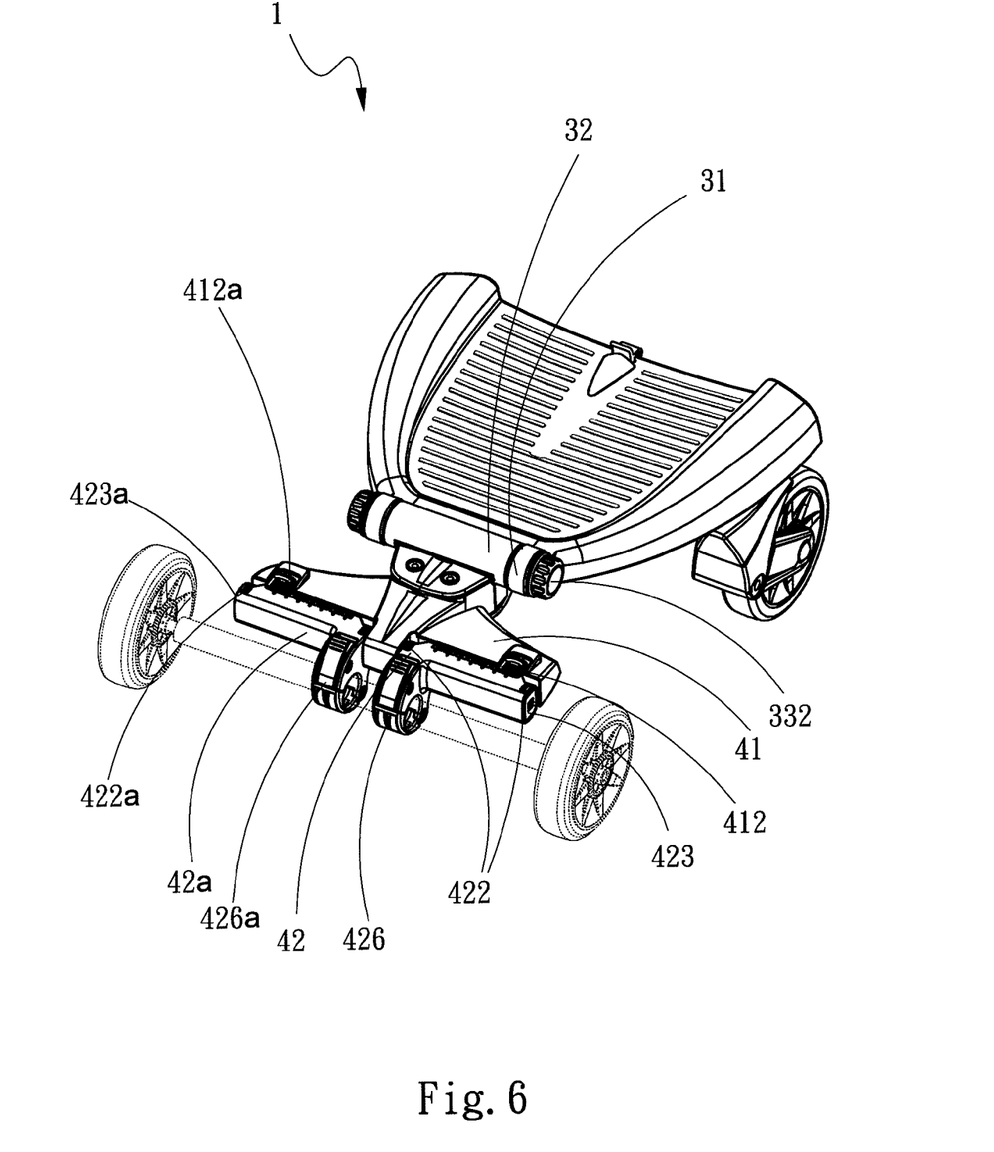
FIG. 6 is a perspective view of the invention in use condition-2.
Figure 7:
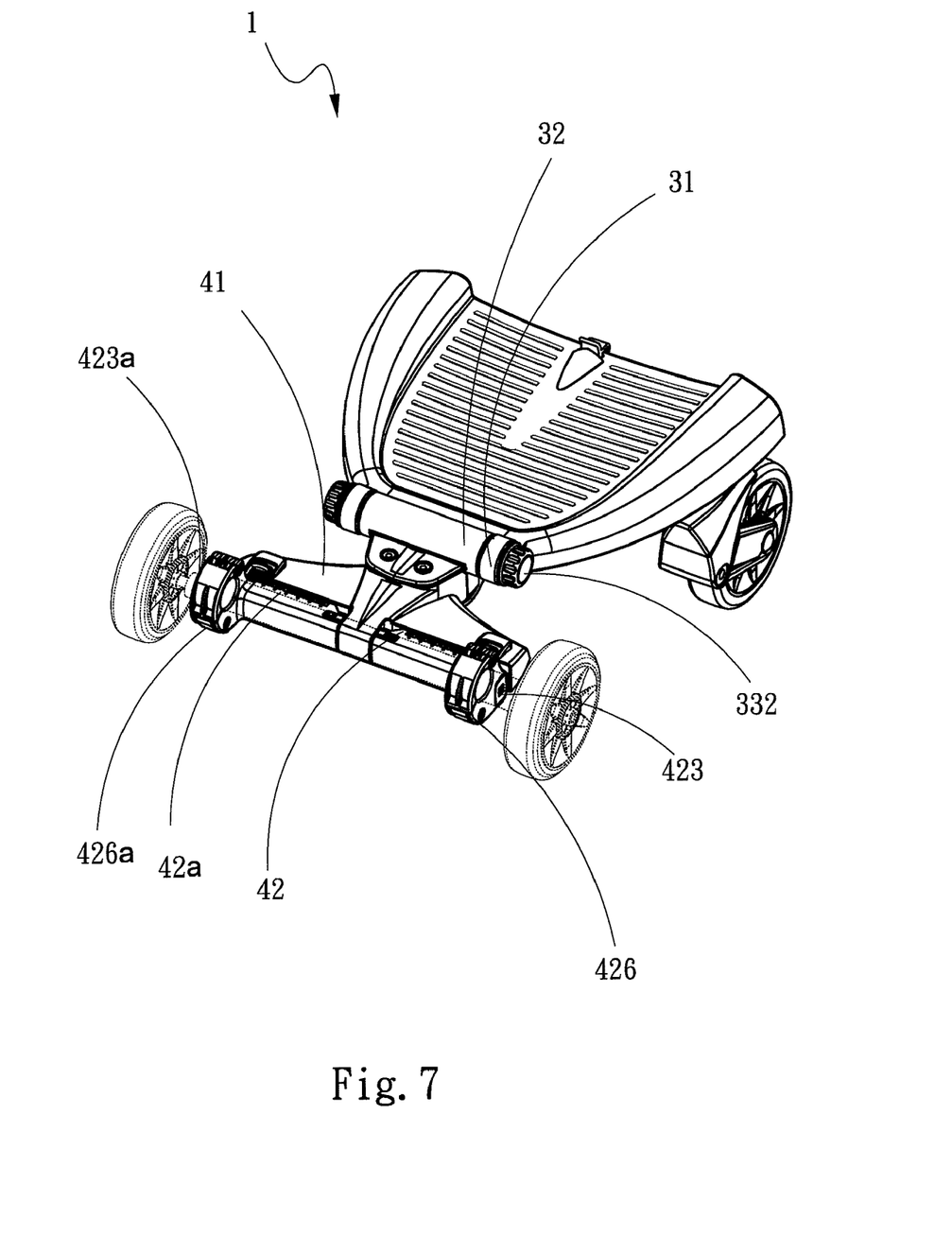
FIG. 7 is a perspective view of the invention in use condition-3.
Figure 8:
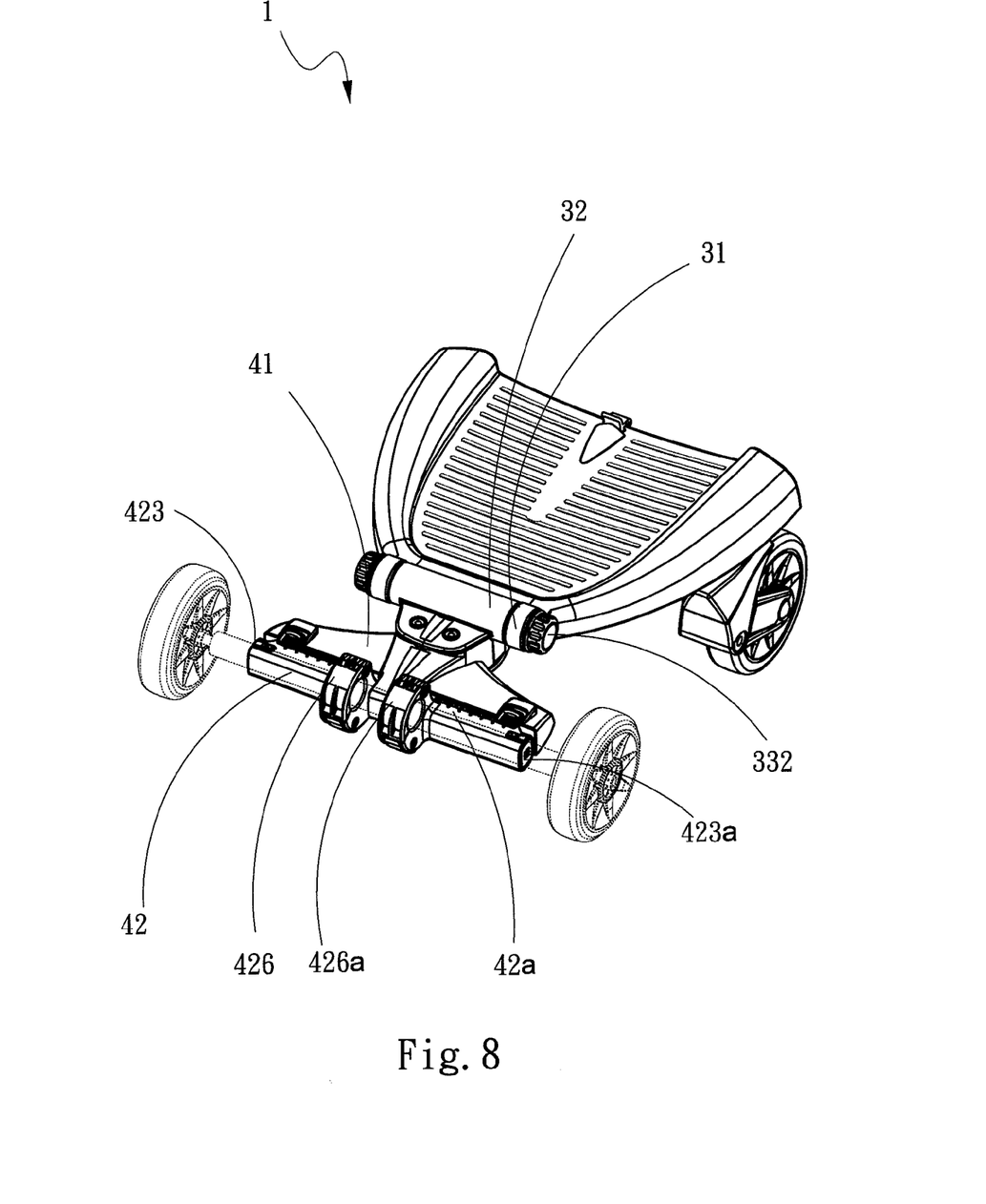
FIG. 8 is a perspective view of the invention in use condition-4.

Referring to FIGS. 4 and 6, in the event that the transverse chassis of the stroller is coupled with a bracing structure, goods holding rack and the like, and the child trailer of the invention cannot be hitched by the clamp means 426 and 426a of the first and second adjustment arms 42 and 42a, or the width of the transverse chassis for hitching is shorter than the interval between the clamp means 426 and 426a, the first and second adjustment arms 42 and 42a can be disassembled, and the ornamental plates 423 and 423a also are disassembled from the latch portions 422 and 422a, exchange the first and second adjustment arms 42 and 42a left and right so that the clamp means 426a and 426 are positioned symmetrically on inner sides to couple on the slide rail 413 in a reverse manner; then latch the ornamental plates 423 and 423a on the penetrating passages 421a and 421 through latch portions 422a and 422, thereby can dodge the structure or fasten on the narrower transverse chassis. Referring to FIGS. 4 and 7, in the event that the transverse chassis of the stroller has to be latched above the first and second adjustment arms 42 and 42a, the first and second adjustment arms 42 and 42a also can be disassembled, exchanged left and right and flipped upside down to couple on the slide rail 413 from two sides thereof so that the clamp means 426a and 426 are positioned symmetrically on the outer sides; then the clamp means 426a and 426 can be adjusted to a desired width to be hitched on the transverse chassis of the stroller above the second and first adjustment arms 42a and 42. Referring to FIGS. 4 and 8, in the event that the transverse chassis of the stroller is hitched above the first and second adjustment arms 42 and 42a, and the transverse chassis also is coupled with a bracing structure, goods holding rack and the like, or the transverse chassis is formed in a narrower width, disassemble the first and second adjustment arms 42 and 42a, and also the ornamental plates 423 and 423a at two sides, flip the first and second adjustment arms 42 and 42a upside down to couple them on the slide rail 413 to position the clamp means 426a and 426 symmetrically on an inner side; then latch the ornamental plates 423a and 423 on the outer sides of the two penetrating passages 421a and 421, thus the transverse chassis of the stroller can be positioned above the second and first adjustment arms 42a and 42 with the clamp means 426a and 426 located on the inner side.

Figure 1:
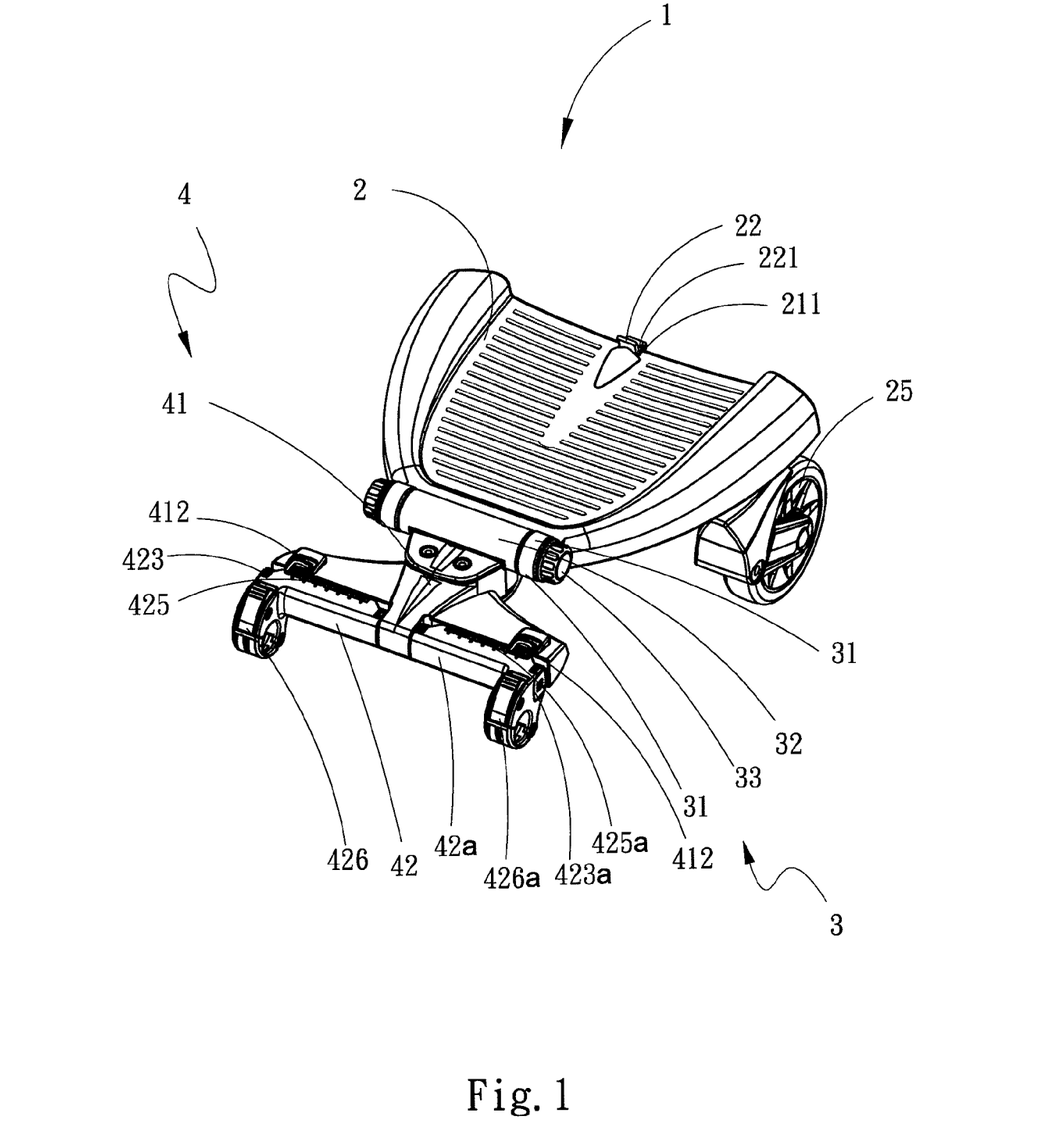
FIG. 1 is a perspective view of the child trailer of the invention.
Figure 2:
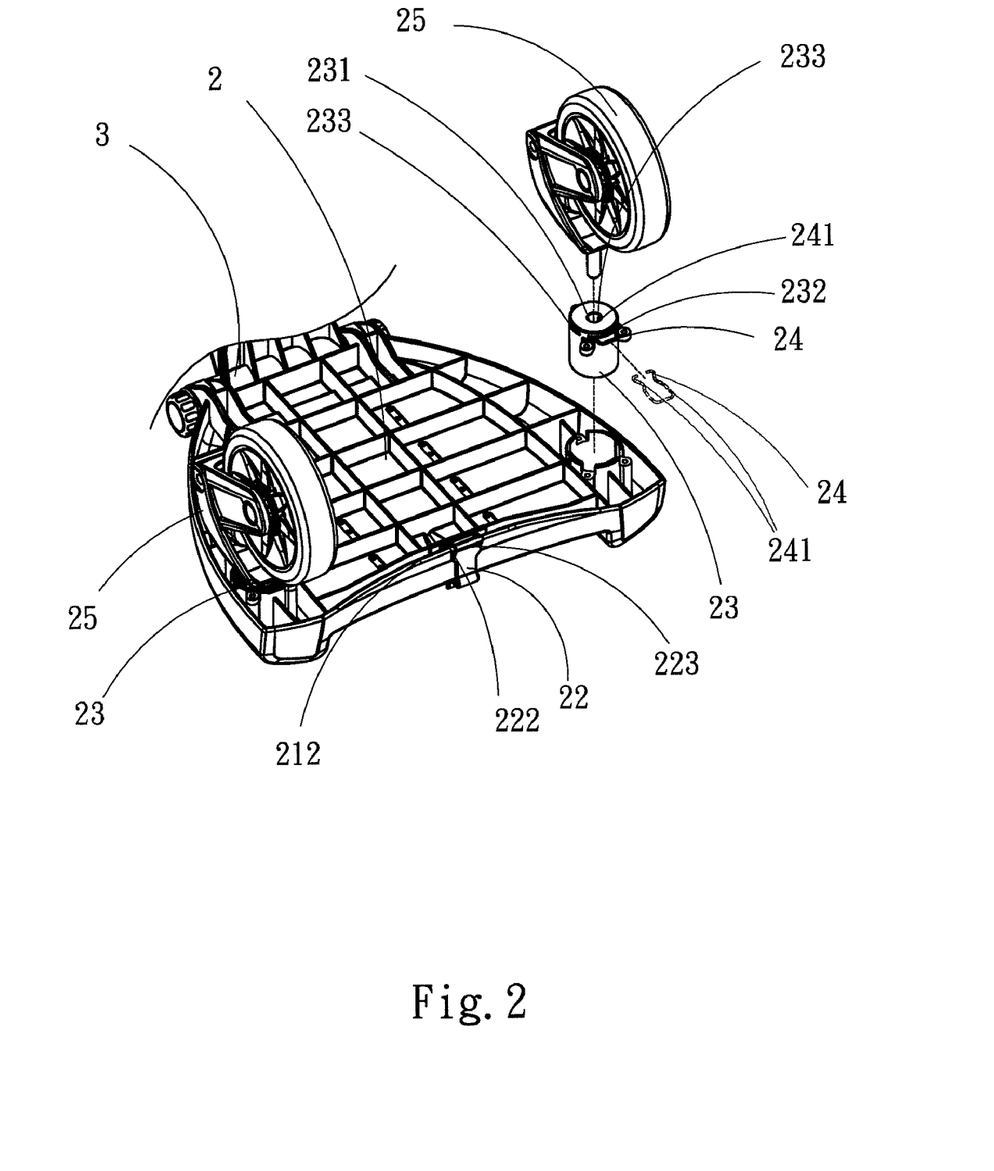
FIG. 2 is a schematic view of the invention for clamping a wheel assembly through an elastic element.
Figure 3:
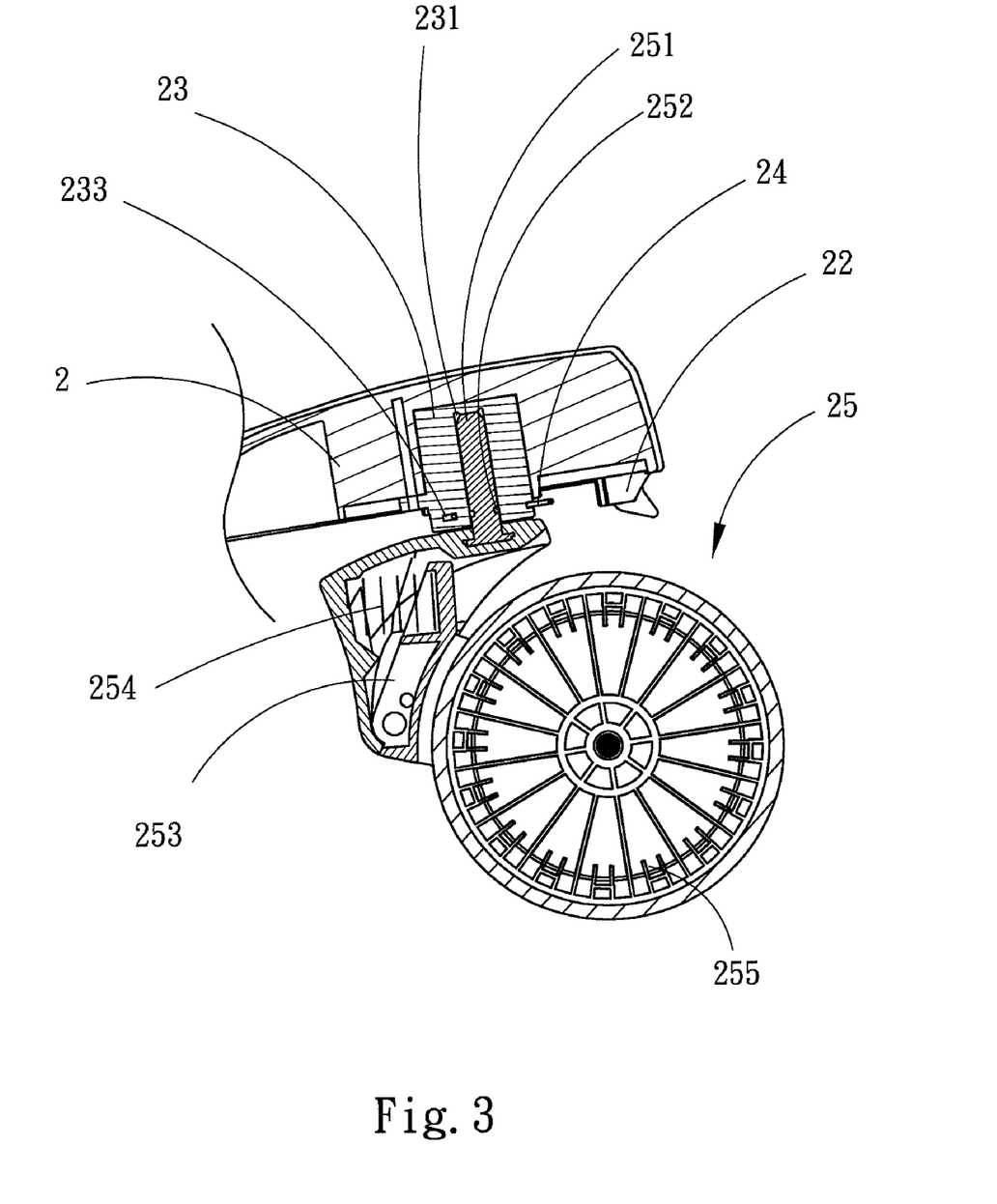
FIG. 3 is a sectional view of a wheel assembly of the invention.

Referring to FIGS. 3 and 4, the wheel holder 253 hinged under the body 2 is a clip with an openable opening. The bracing element 254 has two ends butting the end surfaces close to the opening of the wheel holder 253 to provide shock absorbing effect for the wheel holder 253, hence steadiness and safety improve during moving. Also referring to FIGS. 5 through 8, the symmetrical first and second adjustment arms 42 and 42a can be exchanged left and right and flipped upside down to easily couple with various types of strollers or hand-moving carts.

Figure 9:
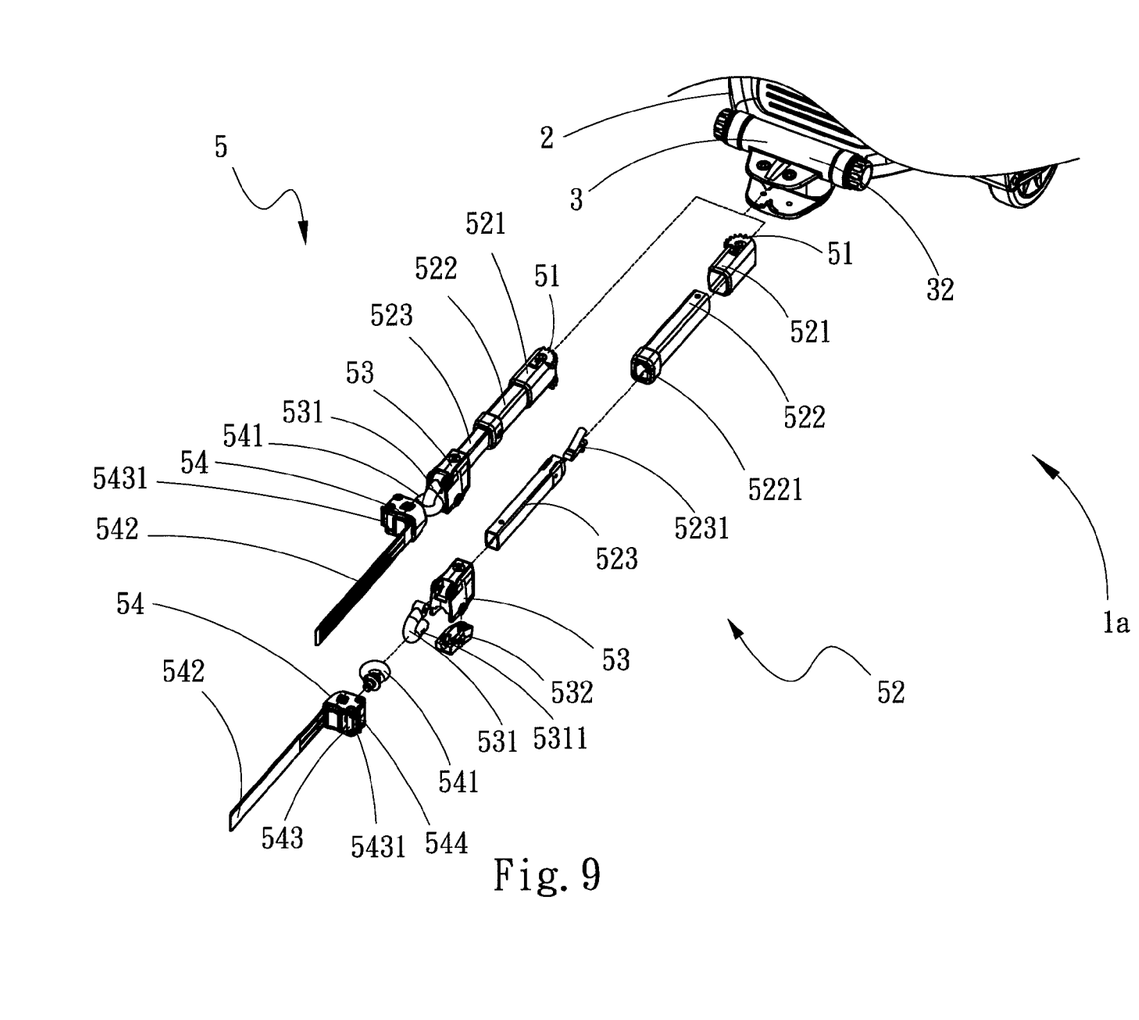
FIG. 9 is an exploded view of an embodiment of the invention with a strap as a coupler.
Figure 10:
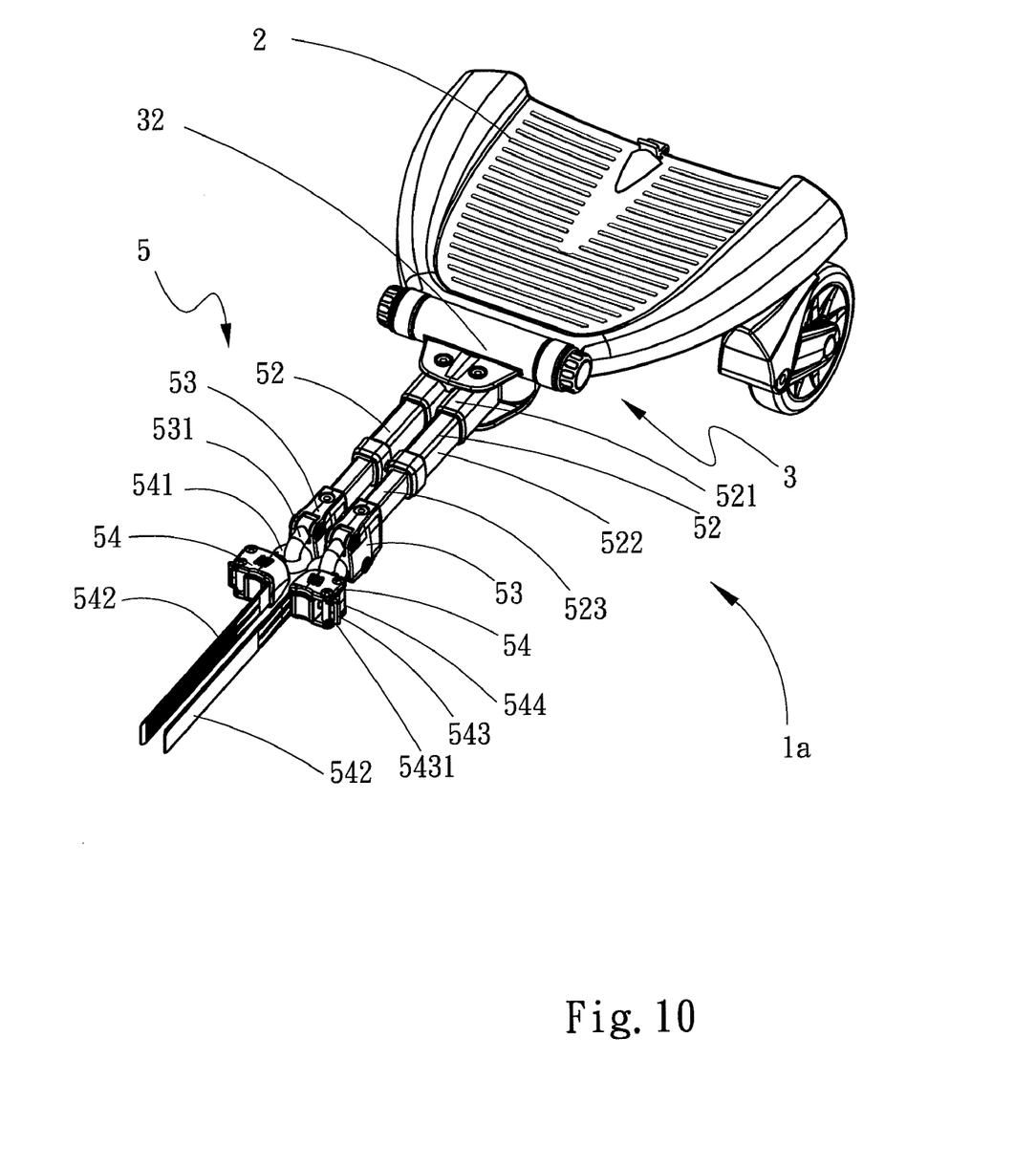
FIG. 10 is a perspective view of an embodiment of the invention with a strap as a coupler.

Refer to FIGS. 9 and 10 for an embodiment of the invention. There is another extensible and retractable coupler 5 fastened to the front end of the joint assembly 3. The coupler 5 has a strap holder 54 at a front end to fasten the child trailer of the invention to the chassis of a stroller. In this embodiment, the coupler 5 includes an extension means which is a pair of engaged fan-shaped gears 51 hinged on the front end of the coupling duct 32 of the joint assembly 3. Each fan-shaped gear 51 has a telescopic tube assembly 52 at the front end. The telescopic tube assembly 52 includes an outer tube holder 521 which has a rear end fastened to the fan-shaped gear 51 and a front side coupled with an outer tube 522. The tubular wall of the outer tube 522 has a plurality of anchor holes 5221. The outer tube 522 further is coupled with an inner tube 523 at the front side. The inner tube 523 has a rear end coupled with an elastic latch member 5231 which elastically latches on the anchor holes 5221 so that the length of the telescopic tube assembly 52 is adjustable. The telescopic tube assembly 52 has a front end fastened to a latch ring 53 which has a front end hinged a hook 531 at an upper side. The hook 531 has a distal end bent downwards to form a latch portion 5311. The latch ring 53 further has an elastic latch element 532 at the front end at a lower side corresponding to and latching the latch portion 5311 of the hook 531. The latch ring 53 latches on a strap holder 54 at the front side. The strap holder 54 has a rear side coupled with a turnable ring 541 run through and latched by the hook 531 of the latch ring 53. The strap holder 54 further has a strap 542 extended forwards from an inner side of the front end that has constant traces on one surface. The strap holder 54 also has an engaging means 543 on an outer side of the front end with a hole 5431 formed thereon. The engaging means 543 has a safety latch 544 at the rear side butting thereon to prevent loosening thereof.

When this embodiment is in use, first, extend the hinged fan-shaped gears 51 towards two sides in an isogonal manner, and adjust the length of the telescopic tube assembly 52 so that the coupler 5 is formed in a desired width and length to mate the chassis of a stroller or hand-moving cart; latch the hook 531 of the latch ring 53 on the ring 541 of the strap holder 54; adjust the angle between the latch ring 53 and strap holder 54; thread the strap 542 through the chassis of the stroller and turn back to thread through the hole 5431 of the engaging means 543 of the same of the strap 542 to be engaged; then latch the safety latch 544 on the engaging means 543 to prevent loosening, thus the child trailer 1a can be fastened securely on the chassis of the stroller or hand-moving cart. Through the engaged strap 542 and engaging means 543 of the strap holder 54, the child trailer 1a can be fastened on the rear side of the stroller.

What is claimed is:
1. A child trailer, comprising:
a body including a plurality of wheel assemblies at the bottom thereof;
a joint assembly which is located in front of the body and includes a pair of holding ducts coaxially located at a front end of the body, each holding duct including a plurality of splines on an inner rim, the two holding ducts being interposed by a coaxial coupling duct, the coupling duct including a plurality of slots on an inner wall corresponding to the splines, the holding ducts and the coupling duct being run through by a telescopic sleeve inside, two outer ends of the telescopic sleeve being coupled with a pair of tooth ducts, each tooth duct including a tooth portion on an outer wall thereof latchable on the splines of the holding duct and the slots of the coupling duct; and a coupler which is fastened to a front end of the joint assembly and includes a seat, a first adjustment arm and a second adjustment arm, the seat including a slide rail in the front end and being fastened to a front end of the coupling duct, the first and second adjustment arms including respectively a penetrating passage coupling symmetrically on the slide rail and a clamp means located at an outer side of each of the first and second adjustment arms, the clamp means including a first clamp and a second clamp engageable with each other.

2. The child trailer of claim 1, wherein the body includes a holder at a rear side thereof that includes a rear edge fastened to a latch.

3. The child trailer of claim 1, wherein the seat close to each of two outer sides includes a safety latch.

4. The child trailer of claim 1, wherein the first and second adjustment arms are symmetrical.

5. The child trailer of claim 1, wherein the first and second adjustment arms are exchangeable left and right to be installed on the seat.

6. The child trailer of claim 1, wherein the first and second adjustment arms are flippable upside down to be installed on the seat.

7. The child trailer of claim 1, wherein the first and second adjustment arms are flippable upside down and exchangeable left and right to be installed on the seat.

8. The child trailer of claim 1, wherein two sides of each penetrating passage of the first and second adjustment arms each include an opening and a latch portion located at the opening.

9. The child trailer of claim 8, wherein the latch portion is latched with an ornamental plate.

10. A child trailer, comprising:
a body including a plurality of wheel assemblies at the bottom thereof;
a joint assembly which is located in front of the body and includes a pair of holding ducts coaxially located at a front end of the body, each holding duct including a plurality of splines on an inner rim, the two holding ducts being interposed by a coaxial coupling duct, the coupling duct including a plurality of slots on an inner wall corresponding to the splines, the holding ducts and the coupling duct being run through by a telescopic sleeve inside, the telescopic sleeve being coupled with a pair of tooth ducts, each tooth duct including a tooth portion on an outer wall thereof latchable on the splines of the holding duct and the slots of the coupling duct; and
a coupler which is fastened to a front end of the joint assembly and includes an extension means hinged on a front end of the coupling duct, the extension means including two telescopic tube assemblies, each telescopic tube assembly being coupled with a latch ring, the latch ring being connected with a strap holder, the strap holder having a strap extending forwards that includes constant traces, the strap holder including an engaging means that includes a through hole to engage with the strap.

11. The child trailer of claim 10, wherein the body includes a holder at a rear side thereof that includes a rear edge fastened to a latch.

12. The child trailer of claim 10, wherein the extension means is a pair of engaged fan-shaped gears.

13. The child trailer of claim 10, wherein the strap holder includes a turnable ring latchable with the latch ring.

14. The child trailer of claim 10, wherein the engaging means includes a safety latch latching and butting the engaging means.

* * * * *